P. Pointon,
Making Pottery,
N° 18,298. Patented Sept. 29, 1857.
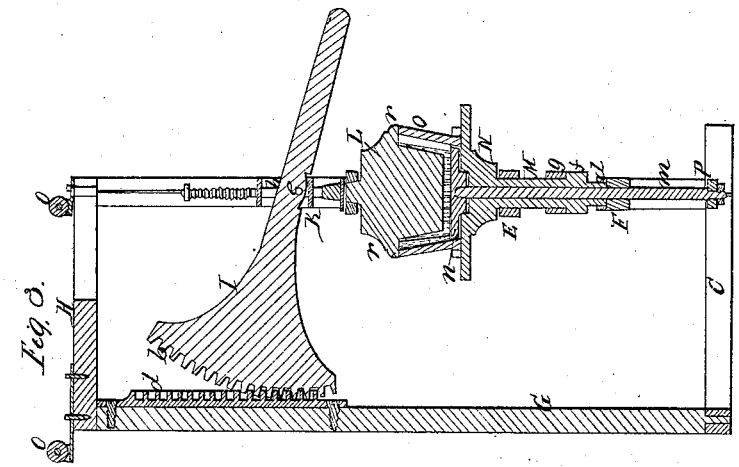
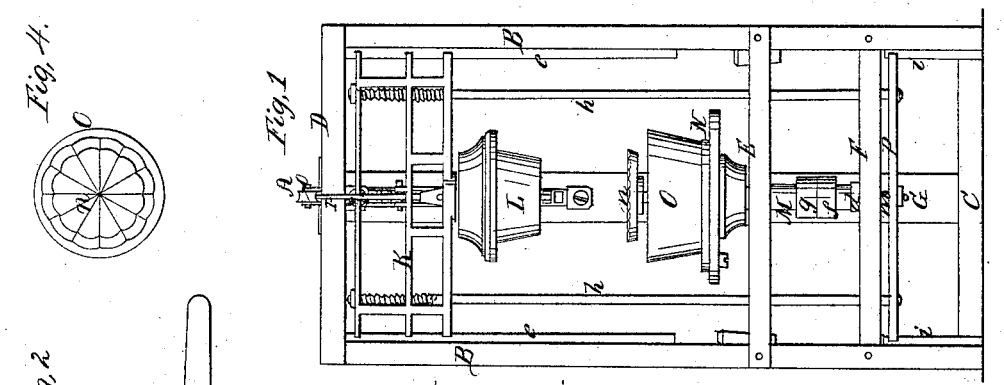
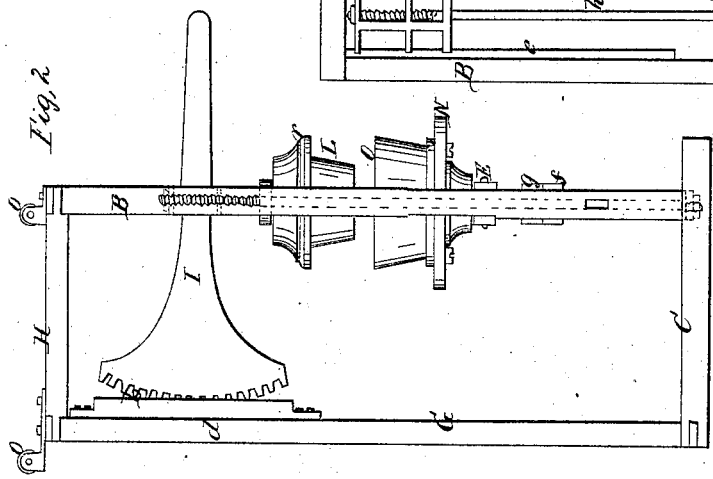

UNITED STATES PATENT OFFICE.

PHILIP POINTON, OF BARABOO, WISCONSIN.

MACHINE FOR MANUFACTURING POTTERY-WARE.

Specification of Letters Patent No. 18,298, dated September 29, 1857.

*To all whom it may concern:*

Be it known that I, PHILIP POINTON, of Baraboo, in the county of Sauk and State of Wisconsin, have invented certain Improvements in Machines for Molding Pottery-Ware, of which the following is a full, clear, and exact description, reference being had to the accompanying drawings, making part of this specification, in which—

Figure 1, is a front view of a molding machine. Fig. 2, is a side elevation. Fig. 3, is a vertical section on the line A, A, of Fig. 1. Fig. 4, detail to be referred to hereafter.

In the drawings the frame of the machine is formed of two vertical posts, B, rising from a suitable bed or stand C'. These posts are connected together by a head brace D and two lower girts or cross braces E, F. From the rear of the stand rises a third post G, which is steadied by a brace H, leading to the head brace, D. Attached to the front side of the post G is a rack $a$, with which engages a toothed segment $b$, on the end of the lever I. This lever is hinged near the middle of its length at $c$, to a frame or gate K, which slides up and down between the posts B, on the ways $e$, to the lower side of this gate K, is attached a piston or plunger L, which is raised and lowered with the gate by the lever I. Supported in a step $d$, on the lower brace F, is a hollow shaft M, which runs in a box or bearing in the brace E. This shaft carries on its upper end a "wheel" on which is secured the mold O, a plan of which is seen in Fig. 4; the shaft with its "wheel" and mold are revolved by a band from any suitable driving power applied to a pulley $f$.

$g$, is a loose pulley on the same shaft. Two rods $h$, with a screw and nut on the top end, pass loosely through holes in the gate K, and through the braces E and F, and are attached at their lower ends to a cross head P, which slides up and down between the posts B, near the bottom of them on ways $i$. A rod $m$ is attached to the middle of the cross head P by a nut and screw. It turns in the cross head and rises vertically from it passing up through the hollow shaft M; on the upper end of this rod $m$ is screwed the removable bottom $n$, of the mold. The nuts on the ends of the rods $h$ are adjusted on their screws so that the gate K may be raised by the lever I a sufficient height as in Fig. 2 for the plunger L to clear the mold when the nuts on the rods $h$, rest on the top of the gate and are raised with it as the motion of the lever I, is continued, and through these rods the cross head P is raised with the gate K. This slides the rod $m$, up through the hollow shaft M, and raises the bottom $n$, up through the mold as in Fig. 1.

Operation: A suitable mold O, having been secured to the "wheel" N and a corresponding bottom being attached to the top of the rod $m$, the operator raises the lever I, into the position seen in Fig. 1, where it is retained by a counterpoise on a cord led over the pulley $o$, on the top of the frame (this cord and weight are not shown in the drawings). He then places a piece of tempered clay on the bottom $n$, which remains stationary in the position shown in Fig. 1 while the mold O, is revolved by a band on the pulley $f$. He then brings down the lever I, into the position of Fig. 3 forcing the plunger L into the mold forming the article to be molded, when the surplus clay will be forced out over the edge of the mold; the projecting shoulder $r$, of the plunger coming down upon the edge of the mold will cut off and smooth the top edge of the article. So soon as the bottom $n$, is brought into contact with the "wheel" N it revolves with the latter, the rod $m$, turning with it. When the operator has thus molded the article he raises the lever I, into the position shown in Fig. 1, which lifts the bottom $n$, with the finished article on it out of the mold, when the article may be removed and the work continue as before.

With the above described arrangement of revolving mold and loose bottom, I am enabled to mold articles of pottery ware either plain or fluted in a much more expeditious and perfect manner than has heretofore been done either by hand or with any machine with which I am acquainted.

I do not wish to be understood as claiming a plunger descending into a revolving mold, nor a movable bottom acted upon through a hollow shaft, both of which I am aware are in use; but,

What I claim as my invention and desire to secure by Letters Patent, is,

Operating the movable bottom ($n$,) and plunger (L,) simultaneously by means of the sliding rods ($h$,) and cross head (P,); in combination with lever (I,) and rack (K,) the whole arranged substantially as herein set forth.

PHILIP POINTON.

Witnesses:
    THOS. R. ROACH,
    P. E. TESCHEMACHER.